US008855667B2

United States Patent
Lada et al.

(10) Patent No.: US 8,855,667 B2
(45) Date of Patent: Oct. 7, 2014

(54) METHOD AND SYSTEM FOR LOCATING A NOTEBOOK COMPUTER

(75) Inventors: Henry F. Lada, Cypress, TX (US); Lee W. Atkinson, Cypress, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 129 days.

(21) Appl. No.: 13/259,517

(22) PCT Filed: Jul. 31, 2009

(86) PCT No.: PCT/US2009/052461
§ 371 (c)(1),
(2), (4) Date: Sep. 23, 2011

(87) PCT Pub. No.: WO2011/014193
PCT Pub. Date: Feb. 3, 2011

(65) Prior Publication Data
US 2012/0015671 A1    Jan. 19, 2012

(51) Int. Cl.
*H04M 3/00* (2006.01)
*H04M 1/00* (2006.01)
*H04W 24/00* (2009.01)
*G06F 1/16* (2006.01)
*H04L 12/66* (2006.01)

(52) U.S. Cl.
CPC ............ *G06F 1/1616* (2013.01); *G06F 1/1684* (2013.01); *G06F 1/1698* (2013.01); *G06F 1/1677* (2013.01); *H04L 12/66* (2013.01)
USPC ........ 455/456.1; 455/418; 455/419; 455/574; 455/456.2; 455/575.3

(58) Field of Classification Search
CPC .............................. G06F 1/1616; G06F 1/1677
USPC ........... 455/418, 419, 456.1, 574, 466, 456.2, 455/575.1, 575.3
See application file for complete search history.

(56) References Cited

U.S. PATENT DOCUMENTS

| 5,936,526 | A | 8/1999 | Klein |
| 6,362,736 | B1 | 3/2002 | Gehlot |
| 6,510,380 | B1 | 1/2003 | Curatolo et al. |
| 7,477,906 | B2 | 1/2009 | Radic et al. |
| 8,169,939 | B2 * | 5/2012 | He et al. ........................ 370/311 |
| 2002/0034953 | A1 | 3/2002 | Tricarico |
| 2003/0117316 | A1 | 6/2003 | Tischer |

(Continued)

FOREIGN PATENT DOCUMENTS

| CN | 101382431 | 3/2009 |
| CN | 101479703 | 7/2009 |
| WO | WO-2006/105552 | 10/2006 |

OTHER PUBLICATIONS

International Searching Authority, International Search Report and Written Opinion, Appln No. PCT/US2009/052461, date of mailing Mar. 23, 2010, 10 p.

(Continued)

*Primary Examiner* — Wesley Kim (57) ABSTRACT

A method for locating a notebook computer by sending a Wake on Wireless WAN (WoW) signal via a wireless network to the notebook computer to switch ON the notebook computer; instructing the notebook computer to determine its own location using GPS if the notebook computer lid is open.

20 Claims, 6 Drawing Sheets

(56) References Cited

U.S. PATENT DOCUMENTS

| | | |
|---|---|---|
| 2005/0149752 A1 | 7/2005 | Johnson et al. |
| 2005/0192741 A1 | 9/2005 | Nichols et al. |
| 2006/0145839 A1 | 7/2006 | Sandage |
| 2006/0270420 A1 | 11/2006 | Brock |
| 2008/0004039 A1 | 1/2008 | Ober et al. |
| 2009/0003292 A1 | 1/2009 | Waltermann et al. |
| 2009/0098889 A1 | 4/2009 | Barcklay et al. |
| 2009/0144574 A1* | 6/2009 | Tseng et al. .......... 713/323 |
| 2009/0149192 A1* | 6/2009 | Vargas et al. .......... 455/456.1 |
| 2009/0172163 A1* | 7/2009 | Carroll et al. .......... 709/226 |
| 2009/0197652 A1* | 8/2009 | Lundstrom et al. .......... 455/574 |
| 2010/0062788 A1* | 3/2010 | Nagorniak .......... 455/456.1 |

OTHER PUBLICATIONS

Examination Report Under Section 18 (3) received in related GB Application No. 1201223.3, mailed Sep. 20, 2013, 5 pgs.

* cited by examiner

METHOD AND SYSTEM FOR LOCATING A NOTEBOOK COMPUTER

BACKGROUND

With the pervasive use of portable computing devices, commonly referred to as notebooks or laptops, there is also an increasing trend of loss of such portable computing devices. Such loss have been attributed to both user carelessness as well as theft.

As part of measures to prevent the loss of such notebook computers, technological measures have been built into these notebook computers to ensure ease of tracking to facilitate retrieval. The first step in attempting to retrieve such a notebook computer is to determine its current location.

Presently, notebook computers have been provided with several means of ascertaining their own location. One of the most popular means is by way of a Global Positioning System (GPS). Other known methods are by triangulation using cellular networks, or wireless access points and Assisted GPS which combines cellular networks with conventional GPS.

Notebook computers with built in GPS modules are able to ascertain their location as long as they are able to communicate with orbiting satellites of the GPS systems.

Using GPS to track such notebook computers invariably consumes large amounts of power from the notebook computer batteries when the GPS modules are in continual communication with the satellites. Continual tracking and location determining using GPS can easily deplete the batteries. Continued unsuccessful attempts to determine location via GPS can similarly deplete the power in the batteries and reduces the possibilities of further attempts to track the notebook with other forms of technologies.

BRIEF DESCRIPTION OF THE DRAWINGS

For a detailed description of embodiments of the invention, reference will now be made to the accompanying drawings in which.

DETAILED DESCRIPTION

Wireless Wide Area Network (WWAN) provides wireless connectivity to the internet achieved through the use of telecommunication cellular technology. A computer adapted with a wireless network hardware would be able to wirelessly connect to a network or to the Internet using cellular technology.

Wake on WWAN (WoW) is now fast becoming an effective way to wirelessly establish contact with a remote computer and to remotely instruct the computer to perform certain actions. Current accepted protocols of initiating a command signal to such WoW enabled computers are by way of Short Messaging Services (SMS). A specific SMS command containing a predetermined sequence of signals is sent to the WoW enabled computer. The WoW enabled computer receiving such an SMS command would in accordance with predetermined instructions, perform such instructions notably that of waking up or switching On the WoW enabled computer. The SMS command may be sent by a user desiring to locate the computer or by a system as part of its standard procedures to ensure all assets are being tracked.

Once the computer is switched ON, other instructions may be sent via SMS to instruct the computer to perform other actions an example of which is to instruct the computer to send a reply back to the user informing the user of a list of last known GPS locations of the computer. In accordance with a current embodiment, an SMS command may be sent to remotely switch ON the computer, following which another SMS command may be sent to instruct the computer to activate its built in GPS module and determine its own location via the GPS module. Alternatively, the SMS command may further be a combined command providing multiple instructions in addition to the WAKE command.

Figure 1:
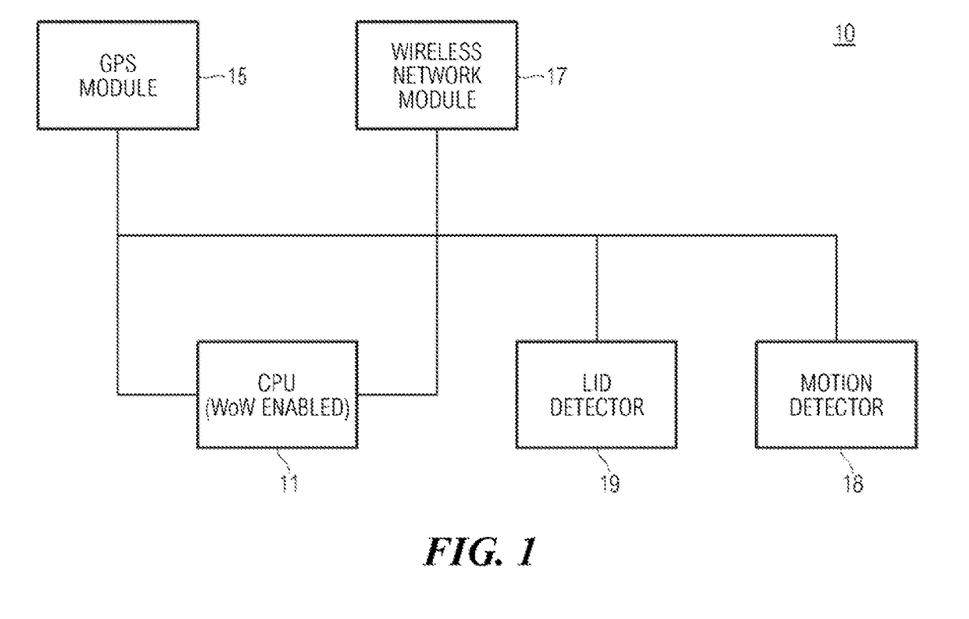
FIG. 1 is a block diagram showing the system for locating a notebook computer in accordance with an embodiment.
Figure 2:
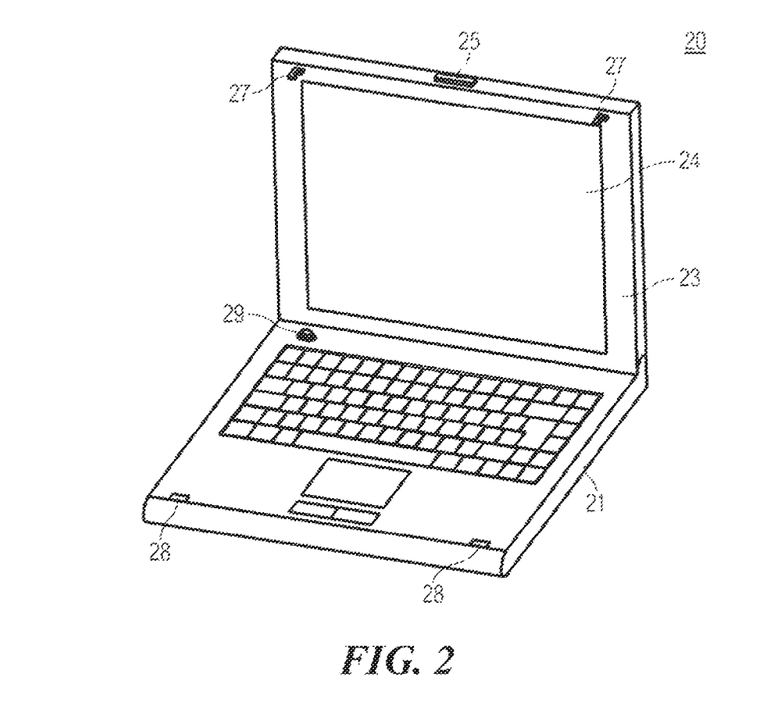
FIG. 2 shows a notebook computer of FIG. 1.

However, a built in GPS module 15 of a notebook computer works well when the notebook computer is in the "open" position. Referring to FIG. 1 and FIG. 2, this "open" position is best characterized by the ready to use position of the notebook computer 20, i.e. when the lid 23 of the notebook computer 20 is lifted away from the body 21 of the notebook computer 20 in a position whereby the screen or monitor 24 in the lid 23 is in an easy to read position by a user. Typically in such a position, the lid 23 would be pointed substantially vertically upwards.

When the lid 24 of the notebook computer 20 is closed, i.e. when the lid 23 and the body 21 are in close proximity and both substantially parallel to each other, the built in GPS module 15 of the notebook computer 20 is often unable to obtain a GPS fix. This may be caused by the proximity of metal components and circuitry in the notebook computer 20 interfering with an antenna of the GPS module.

GPS locators or GPS modules rely on orbiting satellites forming the GPS systems which communicate with the satellites to triangulate the position of the GPS locators or GPS modules. This is often referred to as obtaining a GPS fix. When trying to obtain a GPS fix, GPS locators or GPS modules need to be able to receive RF signals from the orbiting satellites and be able to communicate with at least three such satellites to obtain the GPS fix. When the antenna of the GPS module 15 is in close proximity with other metallic components or other circuitry, communications with the orbiting satellites may be interfered with.

As such, the present embodiment provides for a way to ensure that a GPS fix is attempted when the notebook computer 20 and its lid 23 are in the best position.

Referring to FIG. 1, a system 10 in accordance with the present embodiment is shown. The system 10 may be built into the notebook computer 20 and comprises a motion detector 18, a GPS module 15, a wireless network module 17, and a lid detector 19.

The motion detector 18 built into the notebook computer 20 would serve to detect movement of the notebook computer 20 and be able to ascertain if the notebook computer 20 had substantially moved from one location to another. It may be implemented in several known ways and examples of which are: accelerometers, gyroscopes and triangulation using radio or telecommunication signals.

The GPS module 15 may be a separate card or a circuitry board incorporated into the notebook computer 20. The GPS module 15 would further comprise at least an antenna coupled to the GPS module 15 for communicating with satellites of an external GPS system. The GPS module 15 would by way of the GPS system be able to obtain a fix on its own location and provide this information to the system 10 of the present embodiment.

The wireless network module 17 also comprises at least an antenna coupled to the wireless network module 17. The wireless network module 17 may conform to certain established network protocols examples of which are the UMTS, HSPA, EvDO, LTE or the 802.11 series of wireless communications protocols.

Figure 3:
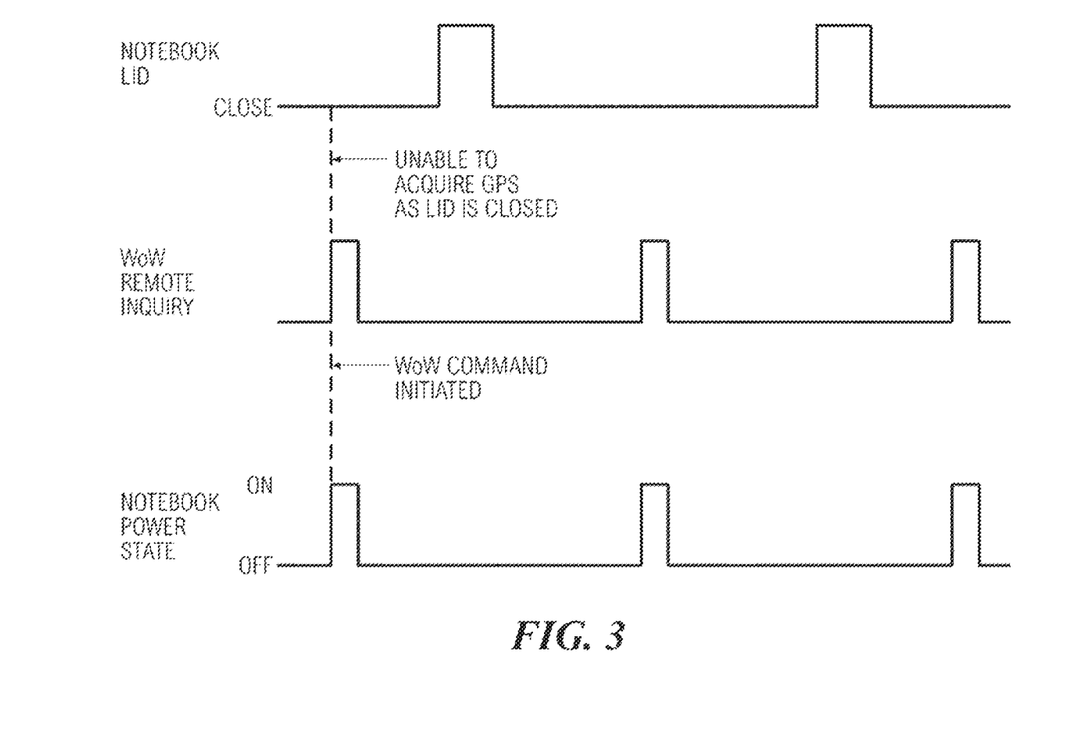
FIG. 3 shows a timing chart of the notebook computer not being able to obtain a GPS location fix
Figure 4:
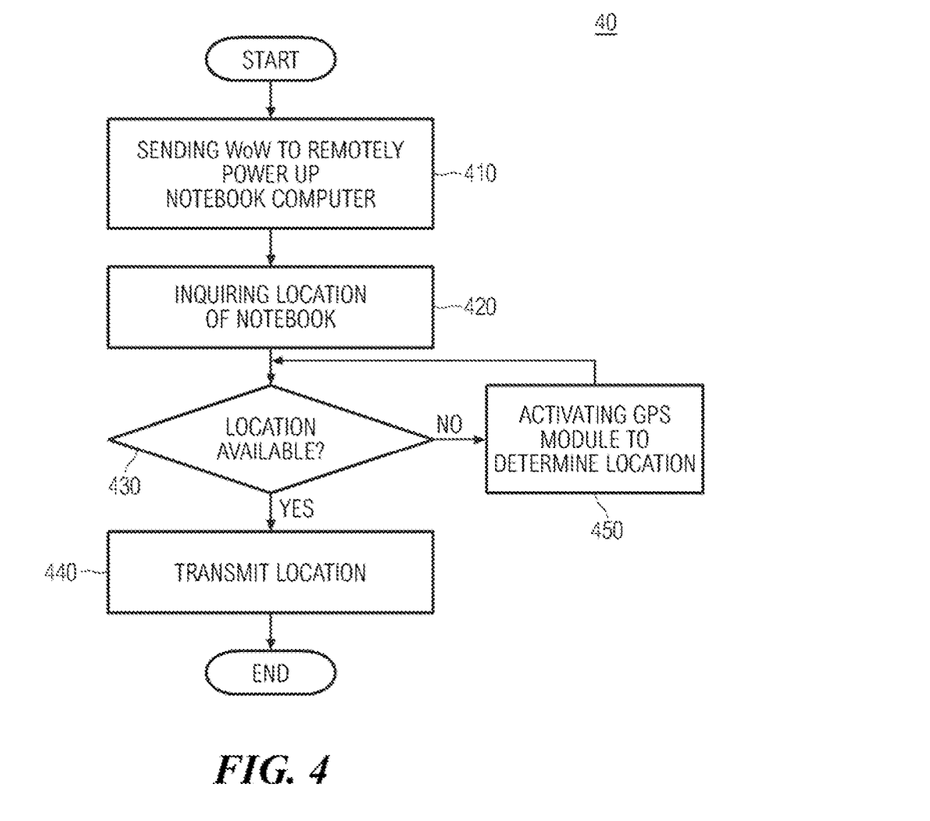
FIG. 4 is a flow chart showing a method for locating a notebook computer.

FIG. 3 and FIG. 4 shows the using of WoW in attempting to determine the location of the notebook computer 20. Referring to FIG. 3, when the lid 23 of the notebook computer 20 is closed, the performance of the GPS module 15 is severely reduced and a GPS fix is not usually possible. A WoW command is sent 410 by the user to remotely power up or switched ON the notebook computer 20, the notebook computer 20 would be powered up or switched ON. Following which an inquiry 420 is made as to the location of the notebook computer 20. If the location is available and known to the notebook computer 20, that location is transmitted 440 to the user. If the location is not known, the GPS module is activated to attempt to determine 450 the location via a GPS fix. However, in the scenario of FIG. 3, the WoW command is sent 410 when the notebook computer is in a physically closed position. Having the notebook computer 20 in a closed position would likely result in the GPS module 15 not being able to obtain a GPS fix and consequently unable to obtain a GPS determined location of the notebook computer 20.

In such a situation whereby the GPS fix cannot be made, present systems would continue to initiate WoW commands to the notebook computer 20 at predetermined time periods to attempt to switch on the notebook computer 20 to obtain a GPS fix. However, if the notebook computer 20 remains closed during the attempts when WoW is initiated, these attempts would primarily result in exhausting the batteries of the notebook computer 20 while unable to retrieve any location information. Eventually, the battery would deplete and the user could no longer locate the notebook via WoW and GPS.

Alternatively, after failure to obtain a GPS fix, instructions could be issued to the notebook computer 20 to automatically wake up or switch ON at regular intervals to attempt a GPS fix. However, this would be a similarly random attempt to wake the notebook computer hoping to coincide with the lid 23 being opened and effectively obtaining a GPS fix. Another way may be to remotely switch ON the notebook computer 20 using the WoW command and keep it ON until the lid 23 is opened to facilitate the GPS fix. However, this would surely be a method which would deplete the batteries in a short span of time.

Figure 5:
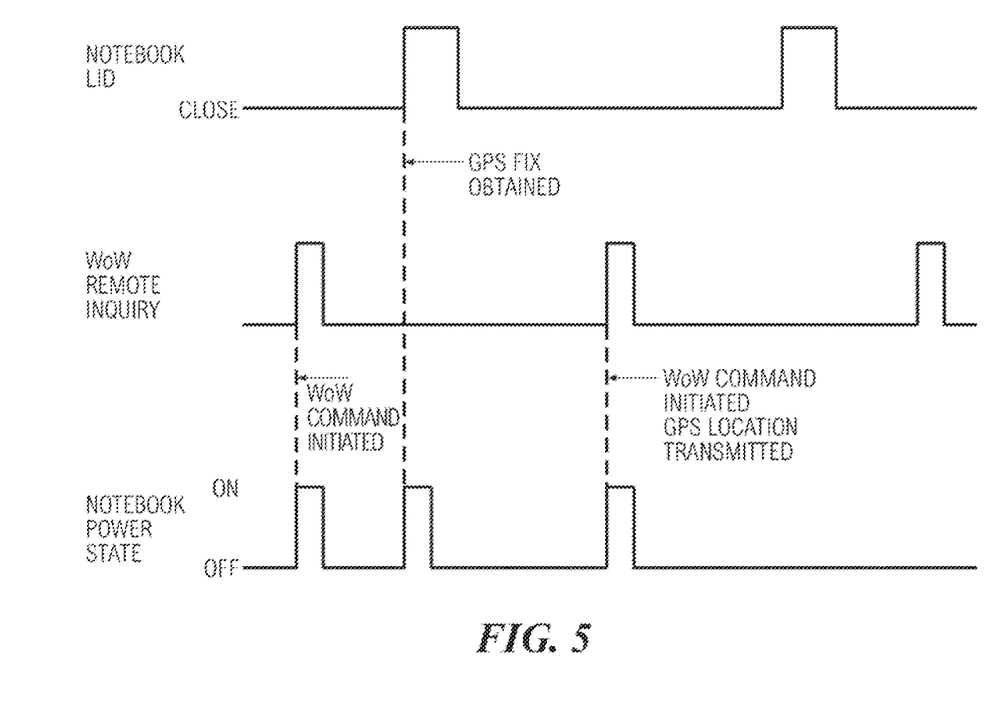
FIG. 5 shows a timing chart of the notebook computer in accordance to an embodiment.
Figure 6:
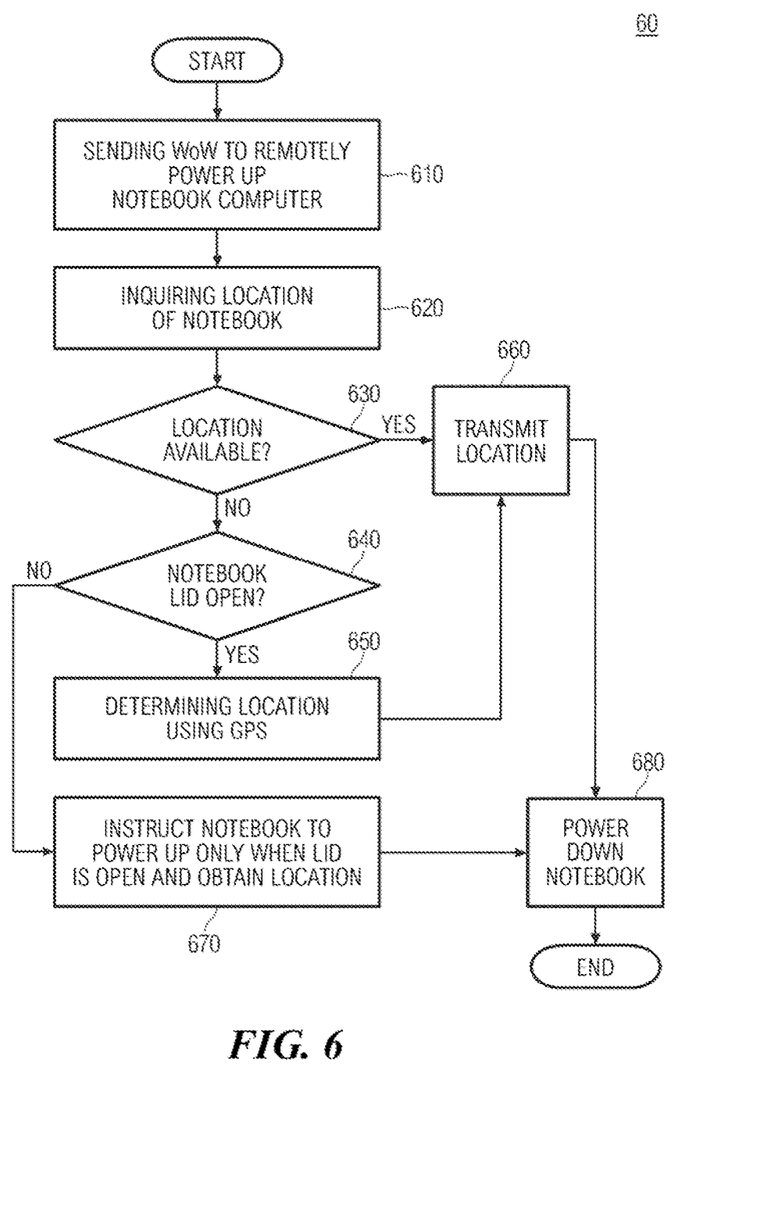
FIG. 6 is a flow chart showing a method in accordance with an embodiment.

Referring to FIG. 5 and FIG. 6, the method 60 in accordance with the present embodiment for locating a notebook computer starts with the sending 610 of a WoW command to remotely switch ON the notebook computer 20 by the user. An inquiry 620 is then sent to ascertain the location of the notebook computer 20. If available, the method 60 proceeds to transmit 660 the location to the user and then following which the notebook computer is switched OFF 680.

If however the location of the notebook computer 20 is not available, a check is performed to ascertain if the lid 23 of the notebook computer 20 is open. If the lid 23 is open, the GPS module 15 of the notebook computer 20 is activated to obtain a GPS fix and consequently determine 650 the location of the notebook computer 20. The method 60 then proceeds to transmitting 660 the GPS determined location back to the user.

If however, the lid 23 of the notebook computer 20 is not open, i.e. closed, instructions are then given to the notebook computer to power up or switch ON itself when the lid 23 is opened and to obtain its own location. The instructions would further comprise activating the GPS module and obtaining a GPS fix and a GPS determined location of the notebook computer. After these instructions had been sent to the notebook computer 20, the notebook computer would shut down or switch OFF automatically to prevent loss of battery power.

In order for the notebook computer to detect that the opening or closing of the lid 23, some form of detection means would be required. The lid detector 19 of the notebook computer 20 would serve to ascertain whether the lid 23 is opened or closed.

Referring to FIG. 2, the lid detector 19 may comprise of a mechanical switch 29 which is depressed when the lid is closed and is released when the lid is open.

The lid detector may further comprise of mechanical switches built into latches 27, 28 of the notebook computer 20 for securing the lid 23 in a closed position. Such mechanical switches would be activated when the lid 23 is closed and provide a signal via the lid detector 23 to the notebook computer that the lid 23 is closed. Other forms of detection such as optical or electromechanical switches may further be used for lid detection.

In another embodiment, the lid detector 19 may further comprise an accelerometer. The accelerometer would be able to detect the positions of the lid 23 and provide an open or close signal depending on the position of the lid relative to the body 21 of the notebook computer 20.

In yet another embodiment, the motion detector 18 built into the notebook computer 20 may be used in conjunction with the method described earlier. The motion detector 18 may be used to determine if the notebook computer 20 has been moved since its last GPS fix. If no further movement is detected by the motion detector 18, there would not be any need to obtain another GPS fix and consequently wasting any battery life. If however, the motion detector 18 detects that the notebook has been moved since the earlier GPS fix, then the location of the notebook computer 20 has changed and an additional GPS fix would be required to obtain the correct location of the notebook computer.

In a further embodiment, the motion detector 18 could be used to further ascertain a current location of the notebook computer 20 after an initial GPS fix has been performed. The initial GPS fix would have obtained the initial location of the notebook computer 20. However, the lid 23 of the notebook computer 20 may be closed thereafter and the notebook computer 20 moved to another location. With the lid 23 closed, the GPS module 15 is prevented from obtaining another GPS fix even though the location of the notebook computer 20 has changed. The motion detector 18 would have detected the movement and be able to ascertain that the location of the notebook computer 20 had changed. The motion detector 18 could then be able to determine the current location of the notebook computer 20 while the lid 23 is closed by detecting and calculating the distance and direction moved from the location of the initial GPS fix. The motion detector 18 may be instructed to at predetermined regular intervals determine the updated locations and store them for future reference.

Referring to FIG. 5, the motion detector 18 determined location of the notebook computer may be transmitted 660 when an inquiry 620 on the location of the notebook computer is made if the initial location has changed or if its not available.

The motion detector 18 may further be instructed to continually track the movement of the notebook computer 20 and continually update and calculate its location in conjunction with any earlier GPS fixes obtained. The motion detector 18 determined locations may be stored in the notebook computer 20 for reference and may be provided in situations when the GPS module 15 is unable to obtain a GPS fix. Alternatively, the motion detector 18 may operate specifically to only detect movement of the notebook computer 20 or be activated only when a request via the WoW method had been initiated.

The motion detector 18 may be implemented in a variety of ways such as using accelerometers, gyroscopes and triangulation using cellular networks, or wireless access points.

In another embodiment, the motion detector 18 and the lid detector 19 may be implemented using a singular module and may make also be implemented using accelerometers, gyroscopes and triangulation using cellular networks, or wireless access points.

Numerous variations and modifications will become apparent to those skilled in the art once the above disclosure is fully appreciated.

What is claimed is:

1. A method comprising:
transmitting a wake-on-wireless wide-area-network (WoW) signal to a portable computing device having WoW capability;
upon the portable computing device entering an awaken state responsive to the WoW signal, transmitting a first instruction to the portable computing device to report back a current location of the portable computing device;
where the current location of the portable computing device is unavailable at the portable computing device, determining whether a lid position sensor of the portable computing device indicates a lid-open state or a lid-closed state; and
in response to the lid position sensor indicating the lid-closed state, transmitting a second instruction to the portable computing device to, when the lid position of the portable computing device subsequently indicates the lid-open state, automatically enter the awaken state, determine the current location using a global positioning system (GPS) module of the portable computing device, and report back the current location,
wherein after receiving the second instruction, the portable computing device exits the awaken state.

2. The method of claim 1, further comprising:
in response to the lid position sensor indicating the lid-closed state, refraining from transmitting any further WoW signals to the portable computing device.

3. The method of claim 1, wherein after the portable computing device exits the awaken state after having received the second instruction, and after the lid position sensor subsequently indicating the lid-open state, the portable computing device automatically enters the awaken state, determines the current location using the GPS module, and reports back the current location.

4. The method of claim 1, further comprising:
in response to the lid position sensor indicating the lid-open state, receiving the current location as determined by the portable computing device using the GPS module after the first instruction was sent.

5. The method of claim 1, further comprising:
where the current location of the portable computing device is available at the portable computing device, receiving the current location as determined by the portable computing device using the GPS module before the first instruction was sent,
wherein the portable computing device exits the awaken state after reporting back the current location.

6. The method of claim 1, wherein the current location of the portable computing device is available where the current location was determined by the portable computing device using the GPS module before the first instruction was sent, and the current location of the portable computing device is still valid.

7. The method of claim 6, wherein the current location of the portable computing device is still valid where a motion detector of the portable computing device has not detected motion since the current location was determined.

8. A method comprising:
receiving, by a portable computing device, a wake-on-wireless wide-area-network (WoW) signal;
in response to receiving the WoW signal, entering an awaken state, by the portable computing device;
after entering the awaken state, receiving, by the portable computing device, a first instruction to report back a current location of the portable computing device;
in response to receiving the first instruction, determining, by the portable computing device, whether the current location is available;
in response to determining that the current location is unavailable, determining whether a lid position sensor of the portable computing device indicates a lid-open state or a lid-closed state;
after determining that the lid position sensor indicates the lid-closed state, processing, by the portable computing device, a second instruction to, when the lid position of the portable computing device subsequently indicates the lid-open state, automatically enter the awaken state, determine the current location using a global positioning system (GPS) module of the portable computing device, and report back the current location; and
after receiving the second instruction, exiting, by the portable computing device, the awaken state.

9. The method of claim 8, further comprising:
after exiting the awaken state after having received the second instruction, and after the lid position sensor subsequently indicating the lid-open state, automatically entering the awaken state pursuant to the second instruction, by the portable computing device;
after automatically entering the awaken state, determining pursuant to the second instruction, by the portable computing device, the current location using the GPS module; and
after determining the current location using the GPS module after having automatically entered the awaken state, reporting back pursuant to the second instruction, by the portable computing device, the current location.

10. The method of claim 8, further comprising:
in response to the lid position sensor indicating the lid-open state, determining, by the portable computing device, the current location using the GPS module;
after determining the current location, reporting back, by the portable computing device; and
after reporting back the current location, exiting the awaken state, by the portable computing device.

11. The method of claim 8, wherein determining whether the current location is available comprises:
determining, by the portable computing device, whether the current location was previously determined using the GPS module before the first instruction was sent;
in response to determining that the current location was previously determined before the first instruction was sent, determining, by the portable computing device, whether the current location as previously determined is still valid; and in response to determining that the current location as previously determined is still valid, concluding, by the portable computing device, that the current location is available.

12. The method of claim 11, wherein determining whether the current location is available further comprises:
in response to determining that the current location as previously determined is no longer valid, concluding, by the portable computing device, that the current location is unavailable.

13. The method of claim 11, wherein determining whether the current location is available further comprises:
in response to determining that the current location was not previously determined before the first instruction was sent, concluding, by the portable computing device, that the current location is unavailable.

14. The method of claim 11, wherein determining whether the current location as previously determined is still valid comprises:
determining, by the portable computing device, whether a motion sensor of the portable computing device has not detected motion since the current location was determined;
in response to the motion sensor having detected motion since the current location was determined, concluding, by the portable computing device, that the current location as previously determined is no longer valid; and
in response to the motion sensor not having detected motion since the current location was determined, concluding, by the portable computing device, that the current location as previously determined is still valid.

15. A portable computing device comprising:
a global positioning system (GPS) module to determine a current location of the portable computing device;
a wake-on-wireless wide-area-network (WoW) module to receive a WoW signal to cause the portable computing device to enter an awaken state;
a lid position sensor to indicate a current state of the portable computing device as one of a lid-open state and a lid-closed state;
a processor; and
a memory storing instructions that when executed by the processor cause the portable computing device to:
receive the WoW signal,
in response to receiving the WoW signal, enter an awaken state, and then receive a first instruction to report back the current location,
in response to receiving the first instruction, determine whether the current location is available, and in response to determining that the current location is unavailable, where the current state is the lid-closed state, process a second instruction
for the portable computing device to, when the lid position of the portable computing device subsequently indicates the lid-open state, automatically enter the awaken state, determine the current location using the GPS module, and report back the current location,
after processing the second instruction, exit the awaken state.

16. The portable computing device of claim 15, wherein, after exiting the awaken state after having received the second instruction, and after the current state subsequently becoming the lid-open state, the portable computing device automatically enters the awaken state, determines the current location using the GPS module, and reports back the current location.

17. The portable computing device of claim 15, wherein, where the current state is the lid-open state, the portable computing device determines the current location using the GPS module, reports back the current location, and exits the awaken state.

18. The portable computing device of claim 15, wherein the portable computing device determines whether the current location is available by determining whether the current location was previously determined using the GPS module before the first instruction was sent and is still valid, and in response to determining that the current location was previously determined and is still valid, concluding that the current location is available.

19. The portable computing device of claim 18, wherein the portable computing device determines whether the current location is available by concluding that the current location is unavailable in response to determining that the current location was not previously determined or was previously determined but is no longer valid.

20. The portable computing device of claim 18, further comprising:
a motion sensor to detect motion of the portable computing device,
wherein where the motion sensor has not detected motion since the current location was previously determined, the current location is still valid,
and wherein where the motion sensor has detected motion since the current location was previously determined, the current location is no longer valid.

* * * * *